(12) United States Patent
Nojima et al.

(10) Patent No.: US 12,478,941 B2
(45) Date of Patent: Nov. 25, 2025

(54) METHOD FOR PRODUCING A QUANTUM DOT

(71) Applicant: SHIN-ETSU CHEMICAL CO., LTD., Tokyo (JP)

(72) Inventors: Yoshihiro Nojima, Annaka (JP); Shinji Aoki, Annaka (JP); Kazuya Tobishima, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 617 days.

(21) Appl. No.: 17/915,704

(22) PCT Filed: Mar. 2, 2021

(86) PCT No.: PCT/JP2021/007932
§ 371 (c)(1),
(2) Date: Sep. 29, 2022

(87) PCT Pub. No.: WO2021/199852
PCT Pub. Date: Oct. 7, 2021

(65) Prior Publication Data
US 2023/0140787 A1 May 4, 2023

(30) Foreign Application Priority Data

Mar. 30, 2020 (JP) ................................. 2020-059887

(51) Int. Cl.
*B01J 13/00* (2006.01)
*C09K 11/08* (2006.01)
(Continued)

(52) U.S. Cl.
CPC ........... *B01J 13/0095* (2013.01); *C09K 11/08* (2013.01); *C09K 11/562* (2013.01); *B82Y 30/00* (2013.01); *B82Y 40/00* (2013.01)

(58) Field of Classification Search
CPC ............................. C09K 11/00; B01J 13/0095
See application file for complete search history.

(56) References Cited

U.S. PATENT DOCUMENTS

2006/0046330 A1  3/2006 Chen et al.
2008/0251006 A1* 10/2008 Didenko ................... C30B 7/00
                                                        117/204
(Continued)

FOREIGN PATENT DOCUMENTS

CN        1560633 A     1/2005
JP   2007-117937 A      5/2007
(Continued)

OTHER PUBLICATIONS

Angel-Huerta. Study of the effect of the synthesis temperature on the photoluminescent properties of InP@ZnS nanocrystals. Journal of Materials Science: Materials in Electronics (2018) 29:15649â15657 (Year: 2018).*

(Continued)

*Primary Examiner* — Matthew E. Hoban
(74) *Attorney, Agent, or Firm* — Oliff PLC (57) ABSTRACT

A method for producing a quantum dot including crystalline nanoparticle fluorescent material, wherein, using a first precursor solution and a second precursor solution containing different elements each other, the second precursor solution is sprayed as an aerosol on the heated first precursor solution, or both the first precursor solution and the second precursor solution are sprayed on a heated solvent as aerosols, and the first precursor solution and the second precursor solution are reacted with each other to synthesize a core particle containing the different elements. The method for producing quantum dots, can suppress the non-uniformity of (Continued)

the particle size of the quantum dots and accompany increase in the distribution of emission wavelengths in large scale synthesis.

6 Claims, 3 Drawing Sheets

(51) Int. Cl.
*C09K 11/56* (2006.01)
*B82Y 30/00* (2011.01)
*B82Y 40/00* (2011.01)

(56) References Cited

U.S. PATENT DOCUMENTS

| | | | |
|---|---|---|---|
| 2010/0167011 A1 | 7/2010 | Dubrow | |
| 2019/0362968 A1* | 11/2019 | Sano | C09K 11/06 |

FOREIGN PATENT DOCUMENTS

| | | |
|---|---|---|
| JP | 2008-088397 A | 4/2008 |
| JP | 2011-116904 A | 6/2011 |
| JP | 2013-544018 A | 12/2013 |
| JP | 2021-062334 A | 4/2021 |
| TW | 200608447 A | 3/2006 |
| WO | 2018/139446 A1 | 8/2018 |

OTHER PUBLICATIONS

Nov. 29, 2022 Office Action Issued in Japanese Patent Application No. 2020-059887.
May 2, 2023 Office Action issued in Japanese Patent Application No. 2020-059887.
Nov. 25, 2024 Office Action issued in Korean Patent Application No. 10-2022-7033923.
Li et al.; "Large-Scale Synthesis of Nearly Monodisperse CdSe/CdS Core/Shell Nanocrystals Using Air-Stable Reagents via Successive Ion Layer Adsorption and Reaction;" J. Am. Chem. Soc.; 2003; pp. 12567-12575; vol. 25.
Murray et al.; "Synthesis and Characterization of Nearly Monodisperse CdE (E=S, Se, Te) Semiconductor Nanocrystallites;" J. Am. Chem. Soc.; 1993; pp. 8706-8715; vol. 115.
May 18, 2021 Search Report issued in International Patent Application No. PCT/JP2021/007932.
Sep. 29, 2022 International Preliminary Report on Patentability issued in International Patent Application No. PCT/JP2021/007932.
Jan. 20, 2024 Office Action Issued in Chinese Patent Application No. 202180026031.2.
Aug. 9, 2023 Office Action and Search Report issued in Chinese Patent Application No. 202180026031.2.

* cited by examiner

METHOD FOR PRODUCING A QUANTUM DOT

TECHNICAL FIELD

The present invention relates to a method for producing a quantum dot.

BACKGROUND ART

Semiconductor crystal particles with nanosized particle diameters are called quantum dots, and excitons generated upon light absorption are confined in nanosized region, so that energy level of the semiconductor crystal particles become discrete. Further, band gap changes depending on the particle diameter. Due to these effects, the fluorescence emission by quantum dots is brighter and more efficient than those by common fluorescent materials and exhibits sharp light emission.

Moreover, based on such nature that the band gap varies depending on the particle diameter, quantum dots are characterized in that the emission wavelength is controllable and are expected to be applied as a wavelength conversion material for solid-state lighting and displays. For example, by using a wavelength conversion material which contains quantum dots in a display, it is possible to realize a wider color range and lower power consumption than conventional fluorescent materials.

There is proposed a method for assembling quantum dots for use as a wavelength conversion material, in which quantum dots are dispersed in a resin material and a resin material containing the quantum dots is laminated with a transparent film, then the laminated film is incorporated into a backlight unit as a wavelength conversion film (Patent Document 1).

CITATION LIST

Patent Literature

Patent Document 1: JP 2013-544018 T

Non Patent Literature

Non Patent Document 1: Journal of American Chemical Society 1993, Vol. 115, p. 8706-8715
Non Patent Document 2: Journal of American Chemical Society 2003, Vol. 125, Issue 41, p. 12567-12575

SUMMARY OF INVENTION

Technical Problem

However, particle size must be controlled in nanometer order in order to obtain desired wavelength, since band gap changes depending on particle size and emission wavelength shifts in quantum dots. Further, there is a problem that the light emission becomes broad due to the variation of the particle size.

Quantum dots are generally synthesized as colloidal particles by reacting precursors in solution, but it is not easy to precisely control the particle size in nanometer order in solution reaction. Further, it becomes more difficult to control the particle size due to problems of precursor concentration unevenness and temperature distribution in the solution reaction, when scaled up for industrialization.

The hot injection method is used as a general method for synthesizing quantum dots. The hot injection method is a method for synthesizing colloidal particles in having uniform particle size in nanometer order, due to homogeneous nucleation, by a precursor solution such as S, Se, P being quickly added to a solution of a precursor of a metal element such as Cd or In heated at a high temperature in an inert atmosphere (Non-Patent Document 1).

However, the hot injection method can synthesize uniform nanometer order colloidal particles in flask-sized small scale synthesis, but in large scale synthesis of tens or hundreds of liters, the uniformity of the particle size of the nanoparticles deteriorates due to generation of local concentration unevenness at the time of charging the precursor solution. Further, the local concentration unevenness increases according to the size of the synthesis scale, and the non-uniformity of the particle size becomes more problematic as the synthesis scale becomes larger.

The present invention has been made to solve the above problems, and an object of the present invention is to provide a method for producing quantum dots capable of suppressing the non-uniformity of the particle size of the quantum dots and the accompanying increase in the distribution of emission wavelengths in large scale synthesis.

Solution to Problem

The present invention has been made to achieve the above object, and provides a method for producing a quantum dot comprising crystalline nanoparticle fluorescent material, wherein, using a first precursor solution and a second precursor solution containing different elements each other, the second precursor solution is sprayed as an aerosol on the heated first precursor solution, or both the first precursor solution and the second precursor solution are sprayed on a heated solvent as aerosols, and the first precursor solution and the second precursor solution are reacted with each other to synthesize a core particle containing the different elements.

According to such a method for producing quantum dots, it becomes possible to suppress the non-uniformity of the particle size of the quantum dots and the accompanying increase in the distribution of emission wavelengths in large scale synthesis.

At this time, the spraying can be performed using a single fluid nozzle or a two fluid nozzle.

According to such a spraying method, it becomes possible to further suppress the non-uniformity of the particle size of the quantum dots and the accompanying increase in the distribution of the emission wavelength in large scale synthesis.

At this time, the spraying can be performed by an ultrasonic method.

According to such a spraying method, it becomes possible to further suppress the non-uniformity of the particle size of the quantum dots and the accompanying increase in the distribution of the emission wavelength in large scale synthesis.

At this time, the core particle can comprise II-VI group compounds, III-V group compounds, perovskite type compounds, or chalcopyrite type compounds, or an alloy contains thereof.

In the method for producing quantum dots of the present invention, such core particles can be particularly preferably selected.

Advantageous Effects of Invention

As described above, according to the method for producing quantum dots of the present invention, local concentration unevenness can be suppressed. In addition, since the droplets become finer and the surface area of the droplets increases, the particle size can be made controllable by improvement of the reactivity. Therefore, since nanoparticles having a uniform size can be obtained even in large scale synthesis, quantum dots having a desired emission wavelength and a narrow distribution of emission wavelength can be obtained. Further, by using the wavelength conversion material and the image display device using the quantum dots according to the present invention, it becomes possible to obtain the wavelength conversion material and the image display device having good color reproducibility.

DESCRIPTION OF EMBODIMENTS

Hereinafter, the present invention will be described in detail, but the present invention is not limited thereto.

As described above, there has been a demand for a method for producing quantum dots that can suppress the non-uniformity of the particle size of the quantum dots and the accompanying increase in the distribution of emission wavelengths in large scale synthesis.

As a result of diligent studies on the above-mentioned problems, inventors of the present have found that by a method for producing quantum dots comprising crystalline nanoparticle fluorescent material, wherein, using a first precursor solution and a second precursor solution containing different elements each other, the second precursor solution is sprayed as an aerosol on the heated first precursor solution, or both the first precursor solution and the second precursor solution are sprayed on a heated solvent as aerosols, and the first precursor solution and the second precursor solution are reacted with each other to synthesize a core particle containing the different elements, it becomes possible to suppress the non-uniformity of the particle size of quantum dots and the accompanying increase in the distribution of emission wavelengths in large scale synthesis, and completed the present invention.

Hereinafter, description will be given with reference to the drawings.

Figure 1:
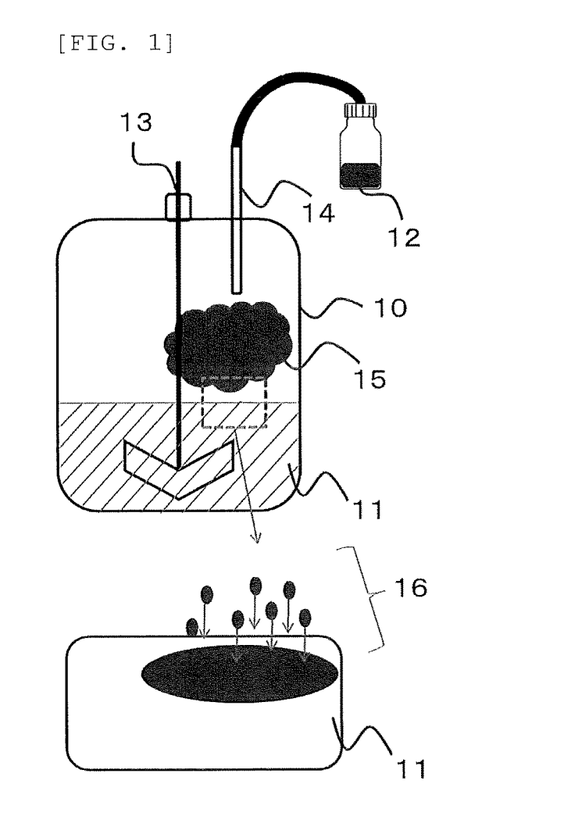
FIG. 1 is a diagram showing examples (Example 1, Example 2) of embodiments of the present invention.

FIG. 1 is a diagram showing an example of an embodiment of the present invention. FIG. 1 shows a state of synthesizing core particles containing elements different from each other, by reacting the first precursor solution 11 and the second precursor solution 12, while to the heated first precursor solution 11 contained in a reaction vessel 10 is stirred by the stirring rod 13, the second precursor solution 12 containing an element different from the one contained in the first precursor solution 11 is sprayed as an aerosol 15 by using the fluid nozzle 14. The lower part of FIG. 1 is an enlarged schematic view of a portion surrounded by a dotted line in the reaction vessel 10. The second precursor solution 12 atomized by the fluid nozzle 14 becomes tiny droplets 16 and is dropped onto the first precursor solution 11. Since the size of the droplet 16 is very small, the local concentration distribution (concentration unevenness) in the first precursor solution 11 becomes small. Further, by continuing stirring with the stirring rod 13, minute droplets 16 of the second precursor solution 12 are distributed over the entire first precursor solution 11. Therefore, according to the method for producing quantum dots of the present invention, the variation in the size of the produced particles is small, and uniform nanoparticles can be obtained even in large scale synthesis.

Figure 2:
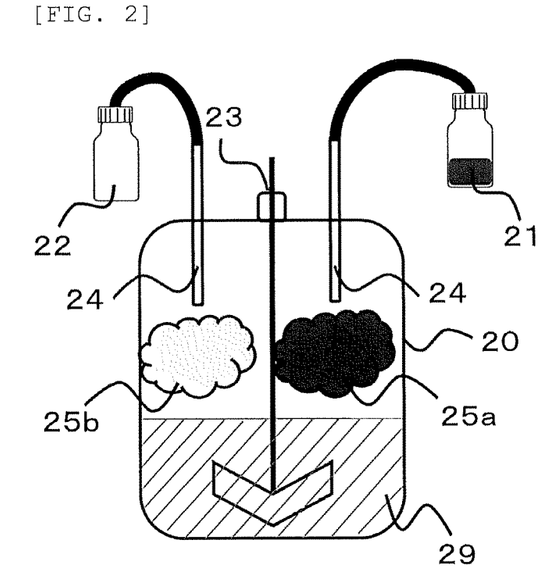
FIG. 2 is a diagram showing an example (Example 3) of an embodiment of the present invention.

FIG. 2 is a diagram showing another example of the embodiment of the present invention. FIG. 2 shows a state of synthesizing core particles containing elements different from each other, by reacting the first precursor solution 21 and the second precursor solution 22, while to a heated solvent 29 contained in the reaction vessel 20 is being stirred by the stirring rod 23, both of the first precursor solution 21 and the second precursor solutions 22 containing different element from the one contained in the first precursor solution 21 are sprayed as aerosols 25a and 25b, respectively, by using the fluid nozzles 24.

In the core particle synthesis of the present invention, the method of spraying the second precursor solution as the aerosol on a heated first precursor solution to cause a reaction, or the method of spraying the first precursor solution and second precursor solution as aerosols to a heated solvent, the aerosol state of the precursor solution is preferably a liquid colloidal state of 800 μm or less. The size of the fine particles of the aerosol can be controlled by the spraying method and the spraying conditions, and can be appropriately selected according to the desired quantum dot characteristics.

The spraying method of the precursor solution in the aerosol state is not particularly limited, and can be appropriately selected according to the scale of the synthesizer and the properties of the target quantum dots.

In the method of spraying the second precursor solution as the aerosol to react with the heated first precursor solution, the solution to be heated as the first precursor solution and the solution to be sprayed as the second precursor solution can be replaced. The two types of solutions to be synthesized may be either the first precursor solution or the second precursor solution. It may be appropriately selected depending on the properties of the solution or the like.

As the method of spraying the precursor solution, it is preferable to use a single fluid nozzle or a two fluid nozzle. In particular, it is preferable to use a two fluid nozzle using an inert gas carrier because the atomization performance is improved, atomization can be performed at a relatively low pressure, and nozzle clogging is unlikely to occur. The structure of the single fluid nozzle and the two fluid nozzle, the spray pressure, and the spray flow rate are not particularly limited and can be appropriately selected depending on the desired characteristics and reaction conditions. Further, there are a liquid pressurization method and a suction method as the liquid supply method, which can be appropriately selected depending on the nature of the precursor solution. Further, the spray pattern of the nozzle has a fan shape or a conical shape, but can be appropriately changed depending on the synthetic scale, the reactivity of the precursor solution, or the like.

Alternatively, the method of spraying the precursor solution is preferably an ultrasonic method. The spraying method by the ultrasonic method includes a method of directly spraying the precursor solution with an ultrasonic nozzle and a method of colloidal formation of the precursor solution by ultrasonic atomization and spraying the colloidal precursor solution using a carrier gas. The spraying method is not particularly limited and can be appropriately selected according to the scale of the synthesizer and the properties of the target quantum dots.

Since the synthesis of quantum dots is generally performed in an inert gas atmosphere in order to exclude oxygen and moisture, the carrier gas is preferably an inert gas. The type of the inert gas can be freely selected, and nitrogen, argon or the like can be exemplified.

Further, a plurality of nozzles having the above method may be used, or different methods may be combined according to the precursor solution, which may be appropriately changed according to the scale of the synthesizer and the synthesis conditions.

The composition of the quantum dots according to the present invention is not particularly limited, and can be appropriately selected depending on the target wavelength conversion material and optical element. The composition of the core particles of the quantum dots is preferably a group II-VI semiconductor, a group III-V semiconductor, a perovskite type semiconductor, a chalcopyrite type semiconductor, or an alloy thereof. In addition, as examples of the composition of the core particles, II-IV-VI group semiconductors and II-IV-V group semiconductors can be exemplified. Specifically, CdSe, CdS, CdTe, InP, InSb, AlP, AlSb, ZnSe, ZnS, ZnTe, $Zn_3P_2$, GaP, GaSb, $CuInSe_2$, $CuInS_2$, $CuInTe_2$, $CuGaSe_2$, $CuGaS_2$, $CuGaTe_2$, $CuAlSe_2$, $CuAlS_2$, $CuAlTe_2$, $AgInSe_2$, $AgInS_2$, $AgInTe_2$, $AgGaSe_2$, $AgGaS_2$, $AgGaTe_2$, $CsPbCl_3$, $CsPbBr_3$, $CsPbI_3$, $CH_3NH_3PbCl_3$ and mixed crystals thereof can be exemplified.

The quantum dots according to the present invention are not particularly limited and may have a core-shell structure or may have a plurality of shells.

As examples of the composition of the shell layer of the quantum dots, ZnSe, ZnS, AlP, AlN, GaN, $Ga_2S_3$, MgSe, MgS or the like can be exemplified. The shell layer may be one layer or two or more layers, and can be appropriately changed depending on the composition and purpose of the core particles. Further, the method of synthesizing the shell is not particularly limited and can be appropriately selected. As examples of the shell synthesis method, SILAR (Successive Ion Layer Adjustment and Reaction) method (Non-Patent Document 2) in which shell precursor solutions of different elements are alternately dropped and reacted or the like can be exemplified.

The size and shape of the core particles and the shell layer are not particularly limited, and can be appropriately selected according to the desired emission wavelength and characteristics. For example, the core particles can be 2 to 6 nm and the shell layer thickness can be 0.4 to 3 nm.

The synthesis conditions such as temperature and concentration at the time of producing the quantum dots of the present invention are not particularly limited and can be appropriately selected according to the composition and the desired emission characteristics. For example, the temperature of the precursor solution or solvent to be heated in the reaction vessel can be 50 to 320° C., and the concentration can be 0.01 to 3.0 M (mol/L). On the other hand, the temperature of the precursor solution to be sprayed can be 50 to 250° C., and the concentration can be 0.01 to 3.0 M (mol/L).

Further, an organic molecule, an inorganic molecule, or a polymer coating layer may be provided on the surface of the quantum dots according to the present invention. Further, structures thereof are not limited, and the thickness of the coating layer can be appropriately selected according to the purpose.

The thickness of the coating layer is not particularly limited, but it is desirable that the thickness is such that the particle size of the quantum dots is less than 100 nm. If the particle size of the quantum dots is less than 100 nm, the dispersibility does not decrease, and the light transmittance does not decrease or agglomeration does not occur. As the coating layer, organic molecules such as stearic acid, oleic acid, palmitic acid, dimercaptosuccinic acid, oleylamine, hexadecylamine, octadecylamine, 1-dodecanethiol, polymers such as polyvinyl alcohol, polyvinylpyrrolidone, polysilsesquioxane, polymethylmethacrylate, polyacrylonitrile and polyethylene glycol, and inorganic molecules such as silica, alumina, titania, zirconia, zinc oxide and gallium oxide can be exemplified.

Further, it is possible to provide a wavelength conversion material containing quantum dots according to the present invention. As examples of the applications of the wavelength conversion material, such as a wavelength conversion film and a color filter can be mentioned, but the present invention is not limited to these applications. Due to the effect of the quantum dots according to the present invention, it is possible to obtain a wavelength conversion material having a target emission wavelength, good color reproducibility, and good luminous efficiency.

For example, by mixing the quantum dots according to the present invention with a resin, the quantum dots are dispersed in the resin, and further, by laminating the resin material, a wavelength conversion film containing the quantum dots according to the present invention can be obtained. In this step, quantum dots dispersed in a solvent can be added to the resin, mixed, and dispersed in the resin. Further, the solvent can be removed, and the powdered quantum dots can be added to the resin and kneaded to disperse the particles in the resin. Alternatively, the monomers and oligomers that are the constituents of the resin can be polymerized in the coexistence of quantum dots. The method for dispersing the quantum dots in the resin is not particularly limited, and other than the illustrated method, an appropriate method can be selected according to the purpose.

The solvent for dispersing the quantum dots is not particularly limited as long as it is compatible with the resin used. Further, the resin material is not particularly limited, and a silicone resin, an acrylic resin, an epoxy resin, a urethane resin or the like can be appropriately selected according to desired characteristics. It is desirable that these resins have a high transmittance in order to increase the efficiency as a wavelength conversion material, and it is particularly desirable that the transmittance is 80% or more.

Further, the wavelength conversion film may contain a substance other than quantum dots, and may contain fine particles such as silica, zirconia, alumina, and titania as a light scattering body, and an inorganic fluorescent material or an organic fluorescent material may be included. As examples of the inorganic fluorescent material, YAG, LSN, LYSN, CASN, SCASN, KSF, CSO, β-SIALON, GYAG, LuAG, SBCA or the like, and organic fluorescent material, perylene derivative, anthraquinone derivative, anthracene derivative, phthalocyanine derivative, cyanine derivative, dioxazine derivative, benzoxazinone derivative, coumarin derivative, quinophthalone derivative, benzoxazole derivative, pyrarizone derivative or the like can be exemplified.

The method for producing the wavelength conversion material containing the quantum dots according to the present invention is not particularly limited, and can be appropriately selected depending on the intended purpose. For example, a wavelength conversion material can be obtained by applying a resin composition in which quantum dots are dispersed in a resin to a transparent film such as PET or polyimide, curing the resin composition, and laminating the resin composition.

For coating on the transparent film, a spraying method such as spraying or inkjet, a spin coating or bar coater, a doctor blade method, a gravure printing method or an offset printing method can be used, and a resin layer is formed by coating. Further, the thicknesses of the resin layer and the transparent film are not particularly limited and can be appropriately selected depending on the intended use.

As one of the embodiments of the quantum dots according to the present invention, for example, there can be provided a backlight unit in which a wavelength conversion film containing the quantum dots according to the present invention is installed on a light guide panel surface coupled to a blue LED. Further, it is also possible to provide an image display device in which a wavelength conversion film containing quantum dots according to the present invention is arranged between a light guide panel surface coupled to a blue LED and a liquid crystal display panel.

In these embodiments, the wavelength conversion film containing the quantum dots according to the present invention absorbs at least a part of the blue light of the primary light as a light source and emits the secondary light having a wavelength longer than that of the primary light. Thereby, it can be converted into light having an arbitrary wavelength distribution depending on the emission wavelength of the quantum dot.

EXAMPLE

Hereinafter, the present invention will be described in detail with reference to examples, but these do not limit the present invention.

For the evaluation of the fluorescence emission characteristics the quantum dots, the luminous properties were measured using a quantum efficiency measurement system (QE-2100 manufactured by Otsuka Electronics Co., Ltd.) with an excitation wavelength of 450 nm. The particle size of the droplet at the time of spraying is shown by the average of the measured values by the laser Doppler method.

Example 1

FIG. 1 is a diagram showing an apparatus for manufacturing quantum dots used in Example 1. 10 L of 1-octadecene as a solvent, 200 g of indium acetate and 450 g of myristic acid were put into a 50 L reaction vessel 10 and degassed at 120° C. for 3 hours. After degassing, the inside of the reaction vessel 10 was filled with nitrogen gas, and the reaction was carried out in a state where oxygen was blocked. This solution was referred to as the first precursor solution 11.

The first precursor solution 11 was heated to 280° C., and to the first precursor solution 11 being stirred with the stirring rod 13, 1.5 L of tris (trimethylsilyl) phosphine diluted 10-fold with 1-octadecene as the second precursor solution 12 was sprayed with a fan shaped single fluid nozzle 14 to bring it into an aerosol 15 state, and the solution was dropped. The spraying conditions were a nitrogen gas pressure of 0.05 MPa and an injection rate of about 1 L/min. At this time, the average particle size of the droplet 16 was about 230 μm. Then, the reaction was carried out at 280° C. for 20 minutes to synthesize InP core particles.

A zinc solution was prepared by adding 270 g of anhydride zinc acetate, 2 L of oleic acid and 1 L of oleylamine to 5 L of 1-octadecene and similarly degassing at 150° C. to dissolve anhydride zinc acetate. The zinc solution was dropped by a tubing pump while keeping the solution of the InP core particles obtained as above at 240° C. At this time, the dropping flow rate was 0.5 L/min. After the dropping was completed, the mixture was stirred for 30 minutes while maintaining the liquid temperature at 240° C. Further, the temperature of the solution was set to 260° C., and 2.7 L of 1-dodecanethiol solution was added dropwise by a tubing pump. At this time, the dropping flow rate was 0.5 L/min. After the dropping was completed, the liquid temperature was maintained at 260° C. and the reaction was carried out for 60 minutes.

InP/ZnS core-shell quantum dots were obtained by the above producing method. 5 times by volume of acetone was added to the quantum dot solution after the reaction to precipitate the quantum dots, and a centrifuge was used to perform centrifugation at 10000 rpm ($min^{-1}$) for 10 minutes, and the recovered precipitate was redistributed in toluene. The quantum dots were purified.

As a result of measuring the luminous properties of the InP/ZnS quantum dots obtained by the above steps, the emission wavelength was 532 nm, the half value width of emission was 40 nm, and the internal quantum efficiency was 76%.

Comparative Example 1

Figure 4:
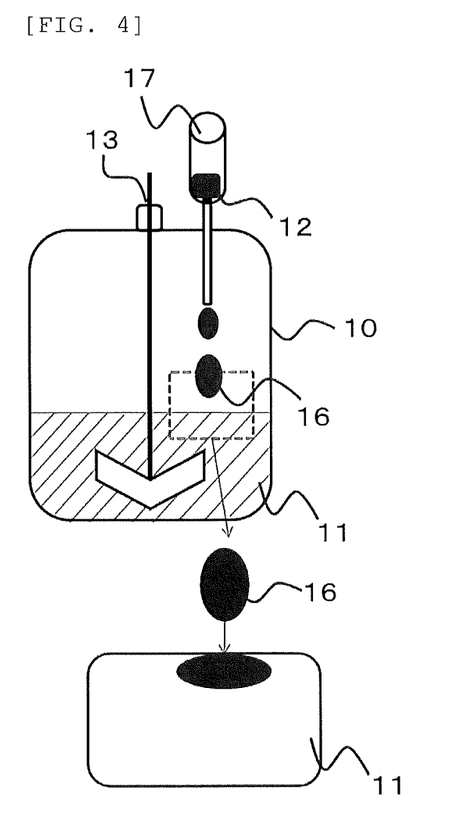
FIG. 4 is a diagram showing an apparatus for producing quantum dots used in Comparative Example 1 and Comparative Example 2.

FIG. 4 is a diagram showing an apparatus for manufacturing the quantum dots used in Comparative Example 1. 15 L of 1-octadecene as a solvent, 300 g of indium acetate and 675 g of myristic acid were put into a 50 L reaction vessel 10 and degassed at 120° C. for 3 hours. After degassing, the reaction was carried out in a state where the inside of the container was filled with nitrogen gas and oxygen was blocked. This solution was referred to as the first precursor solution 11.

The first precursor solution 11 was heated to 280° C., and to the first precursor solution 11 being stirred with the stirring rod 13, 2.2 L of tris (trimethylsilyl) phosphine diluted 10-fold with 1-octadecene as the second precursor solution 12 was added by the dropping funnel 17. The dropping time at this time was about 1 min. Then, it was reacted at 280° C. for 20 minutes to synthesize InP core particles. The lower part of FIG. 4 is an enlarged schematic view of the portion surrounded by the dotted line in the reaction vessel 10. The second precursor solution 12 was dropped onto the first precursor solution 11 as droplets 16 by the dropping funnel 17.

A zinc solution was prepared by adding 270 g of anhydride zinc acetate, 2 L of oleic acid and 1 L of oleylamine to 5 L of 1-octadecene and similarly degassing at 150° C. to dissolve anhydride zinc acetate. The zinc solution was dropped by a tubing pump while keeping the solution of the InP core particles obtained as above at 240° C. At this time, the dropping flow rate was 0.5 L/min. After the dropping was completed, the mixture was stirred for 30 minutes while maintaining the liquid temperature at 240° C. Here, the solution temperature was further set to 260° C., and 2.7 L of 1-dodecanethiol solution was added dropwise by a tubing pump. At this time, the dropping flow rate was 0.5 L/min.

After the dropping was completed, the liquid temperature was maintained at 260° C. and the reaction was carried out for 60 minutes.

InP/ZnS core-shell quantum dots were obtained by the above manufacturing method. 5 times by volume of acetone was added to the quantum dot solution after the reaction to precipitate the quantum dots, and a centrifuge was used to perform centrifugation at 10000 rpm ($min^{-1}$) for 10 minutes, and the recovered precipitate was redistributed in toluene. The quantum dots were purified.

As a result of measuring the luminous properties of the InP/ZnS quantum dots obtained by the above steps, the emission wavelength was 539 nm, the half value width of emission was 52 nm, and the internal quantum efficiency was 70%.

Example 2

The apparatus for producing the quantum dots shown in FIG. 1 was used. 123 g of cadmium oxide, 5.6 kg of hexadecylamine, 2.4 kg of trioctylphosphine oxide, and 900 g of triphenylphosphine were put into a 50 L reaction vessel 10 and degassed at 140° C. for 3 hours. After degassing, the inside of the container was filled with nitrogen gas, and the reaction was carried out in a state where oxygen was blocked. This solution was referred to as the first precursor solution 11.

96 g of selenium powder was added to 9 L of trioctylphosphine in a nitrogen atmosphere, and the mixture was heated and stirred at 150° C. to dissolve the selenium powder and prepare a selenium solution. This solution was referred to as the second precursor solution 12.

After degassing, the selenium solution (second precursor solution 12) was sprayed with the conical two fluid nozzle 14 in a state where the first precursor solution 11 in the reaction vessel 10 was heated to 280° C. to bring it into an aerosol 15 state and dropped. The spraying conditions were a nitrogen gas pressure of 0.2 MPa and an injection amount of about 3 L/min, and at this time, the average particle size of the droplet 16 was about 70 μm. Then, the reaction was carried out at 280° C. for 20 minutes to synthesize CdSe core particles.

Further, 1.5 kg of zinc stearate was added to 1-octadecene 9 L and heated to 150° C. to dissolve it to prepare a uniform solution.

114 g of sulfur powder was added to 9 L of trioctylphosphine in a nitrogen atmosphere, and the mixture was heated and stirred at 150° C. to dissolve the sulfur powder, and a sulfur solution was prepared.

The zinc stearate solution was added dropwise by a tubing pump while maintaining the CdSe core solution at 260° C. At this time, the dropping flow rate was 0.5 L/min. After the dropping was completed, the mixture was stirred for 30 minutes while maintaining the liquid temperature at 260° C. Here, the solution temperature was further set to 280° C., and the sulfur solution was dropped by a tubing pump. At this time, the dropping flow rate was 0.5 L/min. After the dropping was completed, the liquid temperature was maintained at 280° C. and the reaction was carried out for 60 minutes.

To the quantum dot solution after the reaction, 5 times by volume of acetone was added to precipitate the quantum dots, and a centrifuge was used to perform centrifugation at 10000 rpm ($min^{-1}$) for 10 minutes, and the recovered precipitate was redistributed in toluene. The quantum dots were purified.

As a result of measuring the luminous properties of the CdSe/ZnS quantum dots obtained by the above steps, the emission wavelength was 570 nm, the half value width of emission was 33 nm, and the internal quantum efficiency was 82%.

Comparative Example 2

An apparatus for producing the quantum dots shown in FIG. 4 was used. 123 g of cadmium oxide, 5.6 kg of hexadecylamine, 2.4 kg of trioctylphosphine oxide, and 900 g of triphenylphosphine were put into a 50 L reaction vessel 10 and degassed at 140° C. for 1 hour. After degassing, the reaction vessel 10 was filled with nitrogen gas and the reaction was carried out in a state where oxygen was blocked. This solution was referred to as the first precursor solution 11.

96 g of selenium powder was added to 9 L of trioctylphosphine in a nitrogen atmosphere, and the mixture was heated and stirred at 150° C. to dissolve the selenium powder and prepare a selenium solution. This solution was referred to as the second precursor solution 12.

After degassing, the selenium solution (second precursor solution 12) was poured into the solution by the dropping funnel 17 in a state where the first precursor solution 11 in the reaction vessel 10 was heated to 280° C. The dropping time at this time was about 8 min. Then, the reaction was carried out at 280° C. for 20 minutes to synthesize CdSe core particles.

Further, 1.5 kg of zinc stearate was added to 9 L of 1-octadecene and heated to 150° C. to dissolve it to prepare a uniform solution.

114 g of sulfur powder was added to 9 L of trioctylphosphine, and the mixture was heated and stirred at 150° C. to dissolve the sulfur powder, and a sulfur solution was prepared.

The zinc stearate solution was added dropwise by a tubing pump while maintaining the CdSe core solution at 260° C. At this time, the dropping flow rate was 0.5 L/min. After the dropping was completed, the mixture was stirred for 30 minutes while maintaining the liquid temperature at 260° C. Here, the solution temperature was further set to 280° C., and the sulfur solution was dropped by a tubing pump. At this time, the dropping flow rate was 0.5 L/min. After the dropping was completed, the liquid temperature was maintained at 280° C. and the reaction was carried out for 60 minutes.

To the quantum dot solution after the reaction, 5 times by volume of acetone was added to precipitate the quantum dots, and a centrifuge was used to perform centrifugation at 10000 rpm ($min^{-1}$) for 10 minutes, and the recovered precipitate was redistributed in toluene. The quantum dots were purified.

As a result of measuring the luminous properties of the CdSe/ZnS quantum dots obtained by the above steps, the emission wavelength was 575 nm, the half value width of emission was 38 nm, and the internal quantum efficiency was 82%.

Example 3

FIG. 2 is a diagram showing an apparatus for producing quantum dots used in Example 3.

7 L of 1-octadecene and 3 L of oleic acid were put into a 50 L reaction vessel 20, the inside of the reaction vessel 20 was replaced with nitrogen, and then the solution temperature was heated to 200° C.

In a nitrogen atmosphere, 55 mL of diethylzinc was added to 5 L of 1-octadecene and mixed. 48 g of tellurium powder and 39.5 g of selenium powder were added to 5 L of trioctylphosphine, respectively, and the solution was heated to 150° C. in a nitrogen atmosphere to dissolve it. These solutions were referred to as a first precursor solution 21 and a second precursor solution 22, respectively.

Diethylzinc solution and mixed solutions of tellurium and selenium 21 and 22 are simultaneously sprayed into the solvent 29 stirred at 200° C. in the reaction vessel 20 by different fan shaped single fluid nozzles 24 to make aerosols 25a and 25b, and dropped. The spraying conditions were a nitrogen gas pressure of 0.05 MPa and an injection amount of about 1 L/min, and at this time, the average particle size of the droplet was about 230 μm. After the spraying was completed, the ZnTeSe core particles were synthesized by reacting at 250° C. for 30 minutes.

35 mL of diethylzinc, 80 mL of 1-dodecanethiol and 5 L of 1-octadecene were mixed, and the mixed solution was added dropwise to a ZnTeSe core particle solution heated to 250° C. by a tubing pump. At this time, the dropping flow rate was 0.5 L/min. After the dropping was completed, the liquid temperature was maintained at 250° C. and the reaction was carried out for 60 minutes.

To the quantum dot solution after the reaction, 5 times by volume of acetone was added to precipitate the quantum dots, and a centrifuge was used to perform centrifugation at 10000 rpm ($min^{-1}$) for 10 minutes, and the recovered precipitate was redistributed in toluene. The redispersed ZnTeSe/ZnS quantum dots were purified.

As a result of measuring the luminous properties of the ZnTeSe/ZnS quantum dots obtained by the above steps, the emission wavelength was 536 nm, the half value width of emission was 35 nm, and the internal quantum efficiency was 23%.

Comparative Example 3

Figure 5:
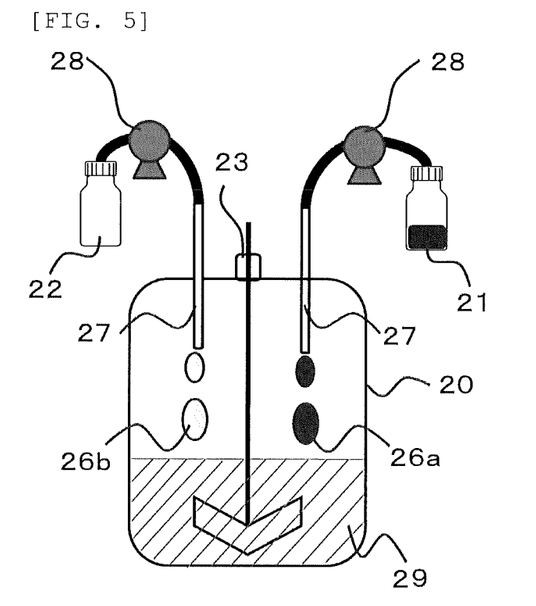
FIG. 5 is a diagram showing an apparatus for producing quantum dots used in Comparative Example 3.

FIG. 5 is a diagram showing an apparatus for producing the quantum dots used in Comparative Example 3.

7 L of 1-octadecene and 3 L of oleic acid were put into a 50 L reaction vessel 20, the inside of the reaction vessel 20 was replaced with nitrogen, the solution temperature was heated to 200° C., and the mixture was stirred with a stirring rod 23.

In a nitrogen atmosphere, 55 mL of diethylzinc was added to 5 L of 1-octadecene and mixed. 48 g of tellurium powder and 39.5 g of selenium powder were added to 5 L of trioctylphosphine, respectively, and the solution was heated to 150° C. in a nitrogen atmosphere to dissolve it. These solutions were referred to as a first precursor solution 21 and a second precursor solution 22, respectively.

The diethyl zinc solution and the mixed solutions of tellurium and selenium 21 and 22 were fed to the dropping nozzles 27 using different diaphragm type liquid feeding pumps 28 and added dropwise to the solvent 29 in the reaction vessel 20 stirred at 200° C. as droplets 26a and 26b, respectively, at the same time. At this time, the dropping flow rate was 0.5 L/min. After the dropping was completed, the ZnTeSe core particles were synthesized by reacting at 250° C. for 30 minutes.

35 mL of diethylzinc, 80 mL of 1-dodecanethiol and 5 L of 1-octadecene were mixed, and the mixed solution was added dropwise to a ZnTeSe core particle solution heated to 250° C. by a tubing pump. At this time, the dropping flow rate was 1.0. L/min. After the dropping was completed, the liquid temperature was maintained at 250° C. and the reaction was carried out for 60 minutes.

To the quantum dot solution after the reaction, 5 times by volume of acetone was added to precipitate the quantum dots, and a centrifuge was used to perform centrifugation at 10000 rpm ($min^{-1}$) for 10 minutes, and the recovered precipitate was redistributed in toluene. The redispersed ZnTeSe/ZnS quantum dots were purified.

As a result of measuring the luminous properties of the ZnTeSe/ZnS quantum dots obtained by the above steps, the emission wavelength was 538 nm, the half value width of emission was 39 nm, and the internal quantum efficiency was 18%.

Example 4

Figure 3:
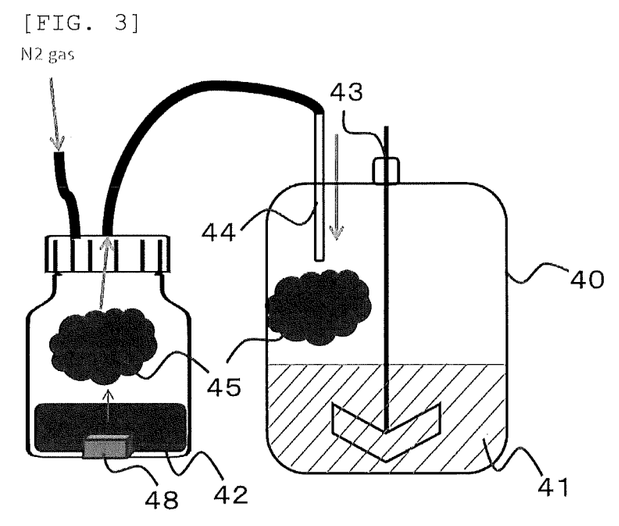
FIG. 3 is a diagram showing an example (Example 4) of an embodiment of the present invention.

FIG. 3 is a diagram showing an apparatus for producing quantum dots used in Example 4. FIG. 3 shows the following states. First, the second precursor solution 42 is atomized by the ultrasonic atomization unit 48 in a nitrogen gas atmosphere to obtain an aerosol 45. Next, while the first precursor solution 41 contained in the reaction vessel 40 is being stirred by the stirring rod 43, the second precursor solution 42 colloidized by ultrasonic waves with the fluid nozzle 44 is sprayed in the aerosol 45 state. Hereinafter, Example 4 will be specifically described.

50 mg of copper (I) chloride, 15 mg of indium acetate and 100 mg of myristic acid were put into 5 L of 1-octadecene in a 50 L reaction vessel 40, and degassed at 120° C. for 1 hour. This solution was referred to as the first precursor solution 41. After degassing, the inside of the reaction vessel 40 was filled with nitrogen gas, and the reaction was carried out in a state where oxygen was blocked.

The sealed container to which the 2.4 MHz ultrasonic atomization unit 48 was attached was replaced with nitrogen, and 5 L of 1-dodecanethiol was charged as the second precursor solution 42. The second precursor solution 42 was atomized by ultrasonic waves using nitrogen gas as a carrier, and sprayed onto the first precursor solution 41 heated to 200° C. in the reaction vessel 40 in the aerosol 45 state. Due to the weight change of the container containing the second precursor solution 42, the spraying was stopped when 3 L was completed, and the $CuInS_2$ core particles were synthesized by keeping the temperature at 200° C. for 30 minutes. The spray rate was about 0.2 L/min and the average particle size of the droplets was 4 μm.

150 g of zinc (II) acetylacetonato, 125 mL of 1-dodecanethiol and 5 L of 1-octadecene were mixed, and the mixed solution was added dropwise to a $CuInS_2$ core particle solution heated to 250° C. by a tubing pump. At this time, the dropping flow rate was 0.5 L/min. After the dropping was completed, the liquid temperature was maintained at 250° C. and the reaction was carried out for 60 minutes.

To the quantum dot solution after the reaction, 5 times by volume of acetone was added to precipitate the quantum dots, and a centrifuge was used to perform centrifugation at 10000 rpm ($min^{-1}$) for 10 minutes, and the recovered precipitate was redistributed in toluene. The quantum dots were purified.

As a result of measuring the luminous properties of the $CuInS_2$/ZnS quantum dots obtained by the above steps, the emission wavelength was 641 nm, the half value width of emission was 68 nm, and the internal quantum efficiency was 71%.

Comparative Example 4

Figure 6:
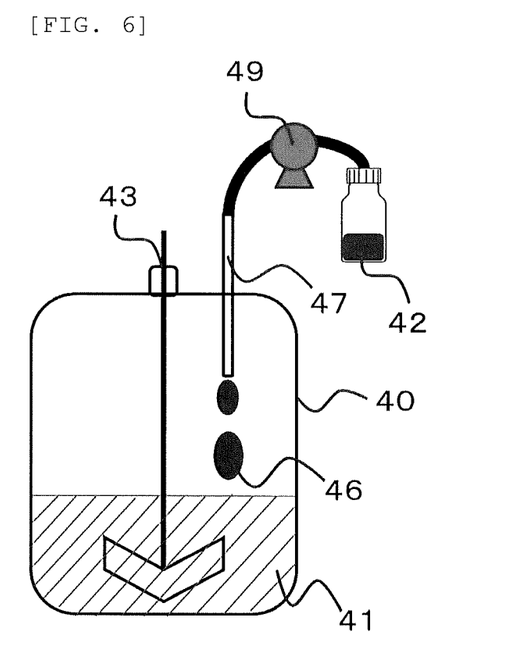
FIG. 6 is a diagram showing an apparatus for producing quantum dots used in Comparative Example 4.

FIG. 6 is a diagram showing an apparatus for producing the quantum dots used in Comparative Example 4.

50 mg of copper (I) chloride, 15 mg of indium acetate and 100 mg of myristic acid were put into 5 L of 1-octadecene in a 50 L reaction vessel 40, and degassed at 120° C. for 1 hour. This solution was referred to as the first precursor solution 41. After degassing, the inside of the reaction vessel 40 was filled with nitrogen gas, and the reaction was carried out in a state where oxygen was blocked.

3 L of 1-dodecanethiol as the second precursor solution 42 was sent by the tubing pump 49 to the place where the first precursor solution 41 was stirred by the stirring rod 43 after heating to 200° C. in the reaction vessel 40, and the droplet 46 of the second precursor solution 42 was dropped by the dropping nozzle 47. The dropping speed at this time was 0.2 L/min. After the dropping was completed, the temperature was maintained at 200° C. for 30 minutes to synthesize $CuInS_2$ core particles.

150 g of zinc (II) acetylacetonato, 125 mL of 1-dodecanethiol and 5 L of 1-octadecene were mixed, and the mixed solution was added dropwise to a $CuInS_2$ core particle solution heated to 250° C. by a tubing pump. At this time, the dropping flow rate was 0.5 L/min. After the dropping was completed, the liquid temperature was maintained at 250° C. and the reaction was carried out for 60 minutes.

To the quantum dot solution after the reaction, 5 times by volume of acetone was added to precipitate the quantum dots, and a centrifuge was used to perform centrifugation at 10000 rpm ($min^{-1}$) for 10 minutes, and the recovered precipitate was redistributed in toluene. The quantum dots were purified.

As a result of measuring the luminous properties of the $CuInS_2$/ZnS quantum dots obtained by the above steps, the emission wavelength was 650 nm, the half value width of emission was 75 nm, and the internal quantum efficiency was 72%.

From the results of the examples and comparative examples, when the precursor solution was sprayed in the state of an aerosol during the synthesis of the core particles of the quantum dots to react, and the particle size could be controlled, and increase in the half value width could be suppressed even if the scale was increased. Namely, in large scale synthesis, it became possible to suppress the non-uniformity of the particle size of the quantum dots and the accompanying increase in the distribution of emission wavelengths. On the other hand, in the comparative example, the droplets to be dropped were large, the local concentration distribution in the solution was large, and the variation in the particle size of the produced particles was large.

The present invention is not limited to the above embodiment. The above-described embodiment is an example, and any examples having substantially the same structure as the technical idea described in the claims of the present invention and having the same effect is included in the technical scope of the present invention.

The invention claimed is:

1. A method for producing a quantum dot comprising crystalline nanoparticle fluorescent material,
wherein,
using a first precursor solution and a second precursor solution containing different elements from each other, both the first precursor solution and the second precursor solution are sprayed separately to a surface of a heated solvent as aerosols, and the first precursor solution and the second precursor solution are reacted with each other to synthesize a core particle containing the different elements.

2. The method for producing a quantum dot according to claim 1, wherein the first precursor solution and the second precursor solution are sprayed using a single fluid nozzle or a two fluid nozzle.

3. The method for producing a quantum dot according to claim 1, wherein the first precursor solution and the second precursor solution are sprayed by an ultrasonic method.

4. The method for producing a quantum dot according to claim 1, wherein the core particle comprises II-VI group compounds, III-V group compounds, perovskite type compounds, or chalcopyrite type compounds.

5. The method for producing a quantum dot according to claim 2, wherein the core particle comprises II-VI group compounds, III-V group compounds, perovskite type compounds, or chalcopyrite type compounds.

6. The method for producing a quantum dot according to claim 3, wherein the core particle comprises II-VI group compounds, III-V group compounds, perovskite type compounds, or chalcopyrite type compounds.

* * * * *